United States Patent Office 3,798,161
Patented Mar. 19, 1974

3,798,161
COMPOSITION FOR PREPARING
GRAPHITE BODIES
Robert L. Hamner and John M. Napier, Oak Ridge, Earl W. Stooksbury, Jacksboro, and Richard A. Strehlow, Oak Ridge, Tenn., assignors to the United States of America as represented by the United States Atomic Energy Commission
No Drawing. Filed Nov. 10, 1970, Ser. No. 88,729
Int. Cl. C01b 31/04
U.S. Cl. 252—1                                2 Claims

ABSTRACT OF THE DISCLOSURE

This invention relates to a graphitizable composition that can be extruded at low temperatures to form a shaped article which upon carbonization yields a body having an open porosity of up to 30 percent as measured by mercury porosimetry, said composition further characterized in that it comprises a homogeneous mixture of graphite or graphitizable filler material and a liquid binder consisting essentially of polymerized isotruxene and acenaphthylene.

BACKGROUND OF THE INVENTION

The invention described herein was made in the course of, or under, a contract with the U.S. Atomic Energy Commission.

The present invention relates to graphite bodies. More particularly, it relates to extruded graphite structures and to extrusion compositions from which said graphite structures can be made.

Because of the inherent high-temperature properties in terms of strength, isotropy, and dimensional stability, graphite has been the preferred matrix material for nuclear fuels and for non-fueled reactor components. In order to use graphite for these or similar purposes it is necessary to consider and take effective measures to counteract its chemical reactivity in high-temperature ambient environments such as hydrogen, air, or oxygen to other reactive fluids. To solve this problem it has been proposed to coat the graphite with adherent protective surfaces, principally chemically resistant refractory metal carbides. While such coatings will reduce or eliminate erosion, it requires consideration of the chemical and physical compatibility between the graphite and its protective coating. Specifically, it is most preferable to match, to as close a degree as possible, the density, strength, modules of elasticity, thermal conductivity, thermal shock, and particularly thermal expansion coefficients of the graphite in relation to a selected protective coating. It is clear that, unless these aforementioned properties are fairly well matched and are kept within reproducible limits, the physical integrity of the coated graphite article becomes questionable. The physical properties of refractory metal carbide coatings present no major problems. However, the physical properties of the graphite can vary over wide ranges, depending upon the character of the raw materials used to form the graphite and upon the process conditions.

At the present time, graphite bodies are formed by mixing either graphite powder or a graphitizable resin such as petroleum coke with tar or pitch binders, extruding or otherwise forming the mixture to a desired shape under pressure, and then firing the shape at a temperature in excess of about 2600° C. to effect complete graphitization. As the shape is fired, the binder volatilizes, at least to some extent. When this occurs, pores are formed within the volume of the body and, while the degree of porosity of the graphite body can be regulated somewhat by adjustment of processing conditions, the porosity cannot be completely eliminated. Not only it is desirable to reduce the degree of porosity, but the kind of porosity formed is extremely important in determining the final density of the graphite body. For example, if the pores produced by the graphitization of the binder are closed as opposed to open or interconnected, it becomes increasingly difficult, if not impossible, to obtain a maximum final density and a maximization of physical properties. In accordance with a major aspect of our invention we have discovered a binder system useful for production of graphite structures which produce a favorably high degree of open porosity, thus facilitating further impregnation of binder into the graphite body to achieve a desired maximum density.

In addition to the porosity factor and binder-coating matching requirement, a binder for use in the manufacture of extruded graphitic structures must, in a preferred condition, allow extrusion at low temperatures and be compatible with the filler material in the sense that a homogeneous single-phase graphite is obtained from both binder and filler. For example, a frequently used binder material in manufacturing graphite structures is coal tar or pitch. These materials are composed of a wide variety of polycyclic aromatic hydrocarbon compounds frequently containing small but deleterious amounts of impurities. As a result, carbonized products and the graphiticity of these products will vary with the composition of the particular pitch used in the mixture. The presence of inorganic and organic impurities is harmful at elevated temperatures where they are prone to react with the graphite and especially with any materials existing within the volume of the graphite as a dispersed phase. For use as a binder for extrusion mixtures with graphite as the filler material, coal-tar pitches are undesirable because they require extrusion at elevated temperatures at which precise dimension control of extruded pieces is difficult to maintain. In addition, coal-tar pitches carbonize to yield an undesirable wide spectrum of graphite structures. Other binder materials are unacceptable because they are deficient in one or more of the qualities required of a low-melting extrusion binder.

SUMMARY OF THE INVENTION

In summary, therefore, what is needed and what this invention provides in one of its principal aspects is an organic liquid binder, liquid at room temperature, at temperatures in the range 30° C. to no more than 100° C., physically compatible with graphite filler material, volatilizable within a narrow range of temperature to produce a cured body having a fairly high (up to as much as 30 percent) degree of open porosity, said binder being convertible at a high coking yield to produce a carbon which can be easily graphitized at a temperature in the range 2200° to 2600° C.

According to the present invention there is provided a liquid binder system which satisfies the aforementioned combination of properties for use in forming shaped bodies, particularly by extrusion processes, said binder system comprising a liquefied air-cured product resulting from the heating of mixtures of isotruxene and acenaphthylene under a designated air-curing cycle under such conditions as to produce a liquid mixture having a melting point in the range 100°–120° C. which can be adjusted to a viscosity suitable for forming an extrudable mixture.

By "isotruxene" we mean to refer to 10,15-dihydro-5H-diindeno-[1,2-α:1',2'-C]-fluorene, as described in copending, coassigned U.S. application Ser. No. 758,391, filed Sept. 9, 1968. Crystalline isotruxene has a melting point of about 210°–223° C. and is convertible to a low-melting polymeric liquid having a melting point in the range 100°–160° C., depending on the air-curing schedule. If, for example, isotruxene is heated in air for 44 hours at a temperature in the range 250–300° C., the crystalline substance will be converted to a non-crystalline polymer which fluidizes at a temperature of approximately 160° C.

In order to obtain a non-crystalline polymeric liquid binder having a melting point lower than 160° C., for example, the isotruxene polymer is mixed with varying quantities of polymerized acenaphthylene to produce a graphitizable liquid binder mixture having a high coking yield and a desired combination of melting point and viscosity. Further reductions in melting point of the binder compisition can be achieved by including small quantities of an organic solvent selected from indene, xylene, benzene, toluene, or polyphenyl ether.

The relative ratio of isotruxene and acenaphthylene in the liquid binder mixture is determined by the liquefying temperature desired and by a comparison of the crystalline graphitic structure resulting from the conversion of the binder to graphite versus the crystalline structure of the graphite used as the filler material. Table I below shows several mixtures of isotruxene and acenaphthylene and corresponding melting points, illustrating the versatility of the binder system in terms of preselecting a desired fluid temperature.

TABLE I

| Binder (wt. percent) | Fluid temperature [1] (° C.) | Viscosity [2] (centipoise) |
|---|---|---|
| 50 ITX,[3] 50 ACN | 120 | ~300 |
| 45.45 ITX,[3] 45.45 ACN, 9.10 indene | 90 | ~300 |
| 41.66 ITX,[3] 41.66 ACN, 16.68 indene | 75–80 | ~300 |
| 38.46 ITX,[3] 38.46 ACN, 23.08 indene | 55–60 | ~300 |
| 38.46 ITX,[4] 38.46 ACN, 23.08 indene | 25–30 | ~300 |

[1] Lowest temperature at which binder is suitable for extrusion.
[2] Viscosity approximated by comparison to fluids of known viscosity.
[3] ITX cured at 300° C. for 24 hours in air; ACN heated at 115° C. for 1 hour in air after melting.
[4] ITX cured at 300° C. for 44 hours in air; ACN heated at 115° C. until melted or "as received" in the crystalline state.

NOTE.—ITX=isotruxene, ACN=acenaphthylene.

An at least equally important advantage of the isotruxene-acenaphthylene binder system is the wide latitude of binder-graphite filler matching available to the user. Thus, for example, in constructing a graphite structure wherein the graphite flour filler material has a given interlayer spacing, the best matching will be the graphite produced from the binder material which has the closest interlayer spacing to that of the graphite filler material. This information can be predetermined by mixing the two major components of the binder mixture (ITX and ACN), converting the mixture to graphite, and then matching up a graphite or graphitizable filler with a given binder-derived graphite. Typical data developed in this manner are shown in Table II below.

graphite pieces by extrusion or other molding operations involving a binder phase. It should, however, be understood that the benefits of this invention can be realized by choosing sources of graphite flour filler other than that obtained from the binder material.

In a typical routine procedure for forming graphite pieces, a matched predetermined ratio of isotruxene polymer and acenaphthylene is blended with graphite flour to form a homogeneous, viscous mixture. The mixture is then placed into the feed chamber of an extrusion press such as is available from the Loomis Engineering and Manufacturing Company, Newark, N.J., and is evacuated to remove trapped air. With the extrusion temperature adjusted to a temperature no higher than about 50° C. extrusion is effected at a pressure of from 40 to 100 tons to produce extruded shapes, generally in rod or tube form. The extruded rods are placed on graphite setters to support the rod whereupon the setter-rods are placed in an air-circulated oven and cured to 250° C. in air over a 48-hour heat cycle. In a typical curing cycle, the rate of heating is raised 5° C. per hour until a temperature of 90° C. is reached, whereupon the rate is decreased 2° C. per hour until a temperature of 135° C. is reached. At that time the rate is raised about 10° C. per hour until 250° C. is obtained. The furnace is then cooled to room temperature over a period of about 4 hours. The cured piece and setter-rod are then transferred to a coking furnace and heated in an inert atmosphere such as argon or nitrogen to 850° C. at a rate of approximately 15° C. per hour to 450° C. and then at a rate of 30° C. per hour to 850° C. over a total period of 60 hours. The resulting carbonized specimen is then transferred to a graphite tube furnace and heated to a temperature in the range 2200°–2300° C. in an inert atmosphere at a rate of 125° C. per hour in order to produce a fully graphitized product. Graphitized pieces produced according to the above representative processing schedule will have a density of the order of 1.65±.05 grams/cc. with an open porosity of the order of 20 percent as measured by mercury porosimetry. Further increases in density up to as much as 1.90 grams/cc. can be achieved by liquid impregnation using the isotruxene-acenaphthylene binder or by gas impregnation using methane, 1,3-butadiene, or other suitable hydrocarbon gases. Then the graphitized piece is evacuated and backfilled at room temperature with liquid binder at a pressure of about 250 p.s.i. after which the impregnated piece is heat-treated up to 850° C., repeating the above-mentioned processing cycle until the desired final density is achieved.

Graphite rods produced in accordance with the extrusion

TABLE II
Carbon yields and X-ray data for carbons obtained from various ITX-ACN mixtures (24 grams ITX except where noted)

| Sample No. | ITX curing conditions | | Materials added (percent by weight) | | | Carbon yield (percent) [1] | X-ray data after heating to 2,300° C. | | |
| | Temperature (° C.) | Time (hrs) | ITX | ACN | Indene | | Interlayer spacing (A.) d 004 | $L_c^2$ (A.) | $L_a^2$ (A.) |
|---|---|---|---|---|---|---|---|---|---|
| A | 300 | 44 | 100 | | | 60 | 1.6915 | 115 | 235 |
| B | | | | 100 | | 40 | 1.686 | 245 | 320 |
| C | 300 | 44 | | 38.46 | 23.08 | 38 | 1.689 | 205 | 275 |
| D | 300 | 44 | | 38.46 | 23.08 | 44 | 1.686 | 165 | 275 |
| E | 300 | 44 | | 38.46 | 23.08 | 39 | 1.6875 | 185 | 235 |

[1] Carbon yield was determined by heating binder mixture to 250° C. in air over a period of 48 hours, heating "cured" mixture to 1,000° C. in flowing helium in 6 hours; indene was not considered in carbon yield.
[2] $L_c$ and $L_a$ values are ±50 A.

From a consideration of the matching concept illustrated by the data in Table II it will be seen that an optimum matching arrangement would, in accordance with this invention, involve the use of graphite flour derived from the same material used as the binder in forming the and representative heat-treating cycle described above utilizing the unique liquid binder system of this invention are characterized in Table III below, in which the filler graphite is identified as POCO AXM, a product obtainable from Poco Graphite, Inc., Decatur, Tex.

TABLE III

| | POCO AXM ITX-ACN |
|---|---|
| As-graphitized flexural strength (p.s.i.): | |
| Avg. | 2410 |
| Max. | 3050 |
| Min. | 2150 |
| Impregnated flexural strength (p.s.i.): | |
| Avg. | 5120 |
| Max. | 5620 |
| Min. | 4630 |
| C.T.E. ($\times 10^{-6}$ in./in./° C.): | |
| As graphitized | 5.49 |
| Final | 5.92 |
| Carbon density (g./cc.): | |
| As graphitized | 1.65 |
| Final | 1.84 |
| Uranium loading (mg./cc.) | 348 |
| Density (g./cc.): | |
| As graphitized | 1.98 |
| Imp. 5X | 2.19 |
| Final leak rate (cc./min.) | 98.6 |
| Final electrical resistance ($\mu$ohm/element inch) | 316 |
| As-graphitized sonic moduli ($\times 10^6$ p.s.i.): | |
| $E_l$ [1] | 0.90 |
| $E_t$ [1] | 1.20 |
| Impregnated sonic moduli: | |
| $E_l$ [1] | 1.4 |
| $E_t$ [1] | 1.8 |
| As-graphitized compressive strength (p.s.i.): | |
| Avg. | 9610 |
| Max. | 10,530 |
| Impregnated compressive strength (p.s.i.): | |
| Avg. | 18,610 |
| Max. | 19,380 |

[1] Both $E_l$ and $E_t$ are longitudinal, but $E_t$ is a transverse vibration.

What is claimed is:

1. An extrudable composition which upon carbonization yields a body having an open porosity of up to 30 percent as measured by mercury porosimetry, said composition further characterized in that it comprises a homogeneous mixture of graphite or graphitizable filler material and a liquid binder consisting essentially of polymerized isotruxene and acenaphthylene and an inert liquid organic diluent which reduces the flow point of the binder, said binder being selected from a group consisting essentially of (a) equal parts by weight of isotruxene and acenaphthylene to allow extrusion of said composition at a temperature of about 120° C., (b) equal parts of isotruxene and acenaphthylene diluted with sufficient indene to depress the flow point to allow extrusion of said composition at a temperature of from 55° to 90° C. wherein said isotruxene has been cured at 300° C. for 24 hours in air, and (c) equal parts of isotruxene and indene and sufficient indene to allow extrusion at a temperature in the range 25°–30° C. wherein the isotruxene has been cured at 300° C. for 44 hours in air.

2. The composition of claim 1 wherein the graphite filler is derived from graphitizing one of the selected binders.

References Cited

UNITED STATES PATENTS 3,535,081  10/1970  Harper et al. _____ 23—209.1
3,574,548  4/1971  Sands et al. _____ 23—209.1

BENJAMIN R. PADGETT, Primary Examiner

U.S. Cl. X.R.

423—448